Figure 21:
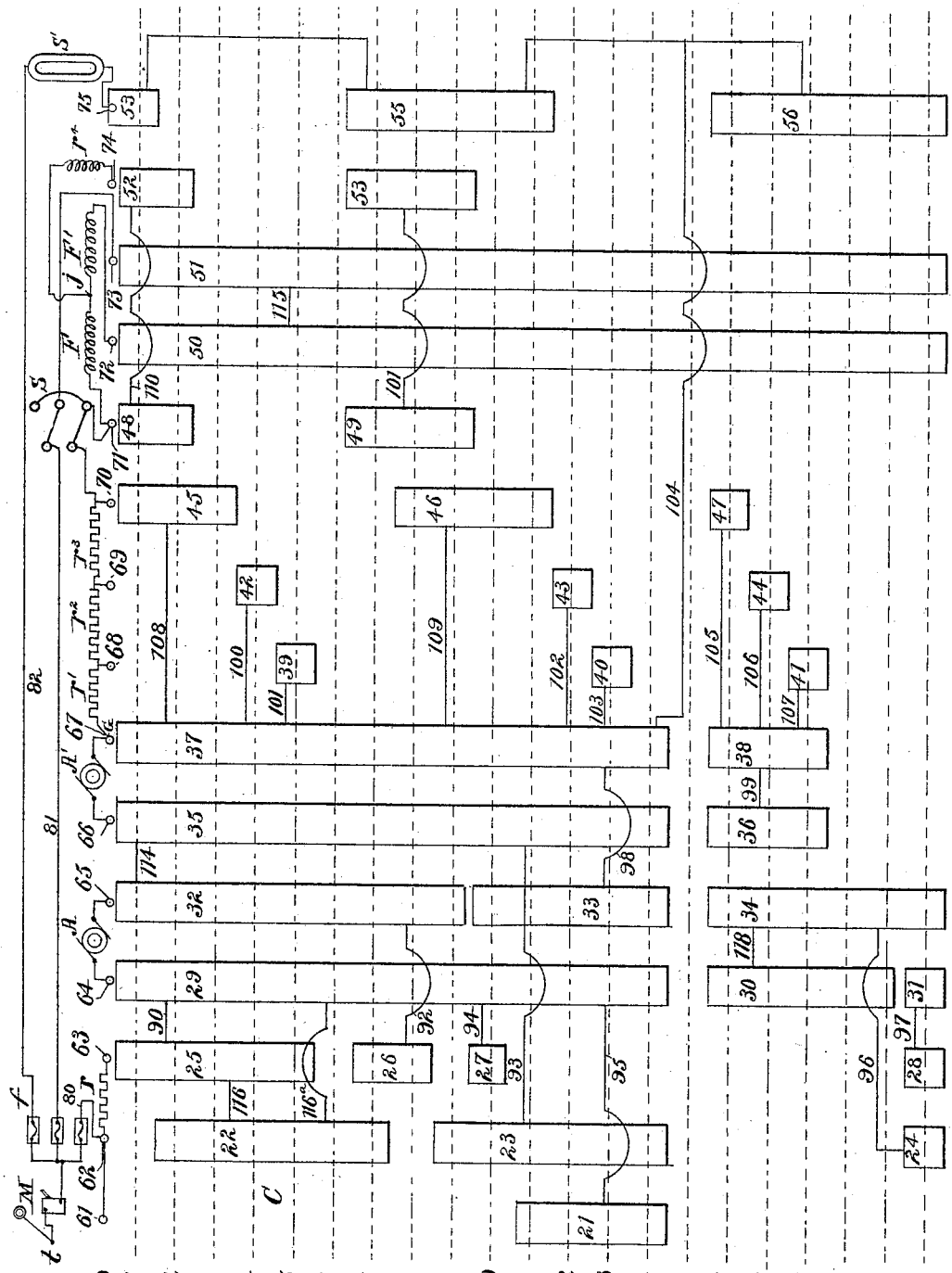

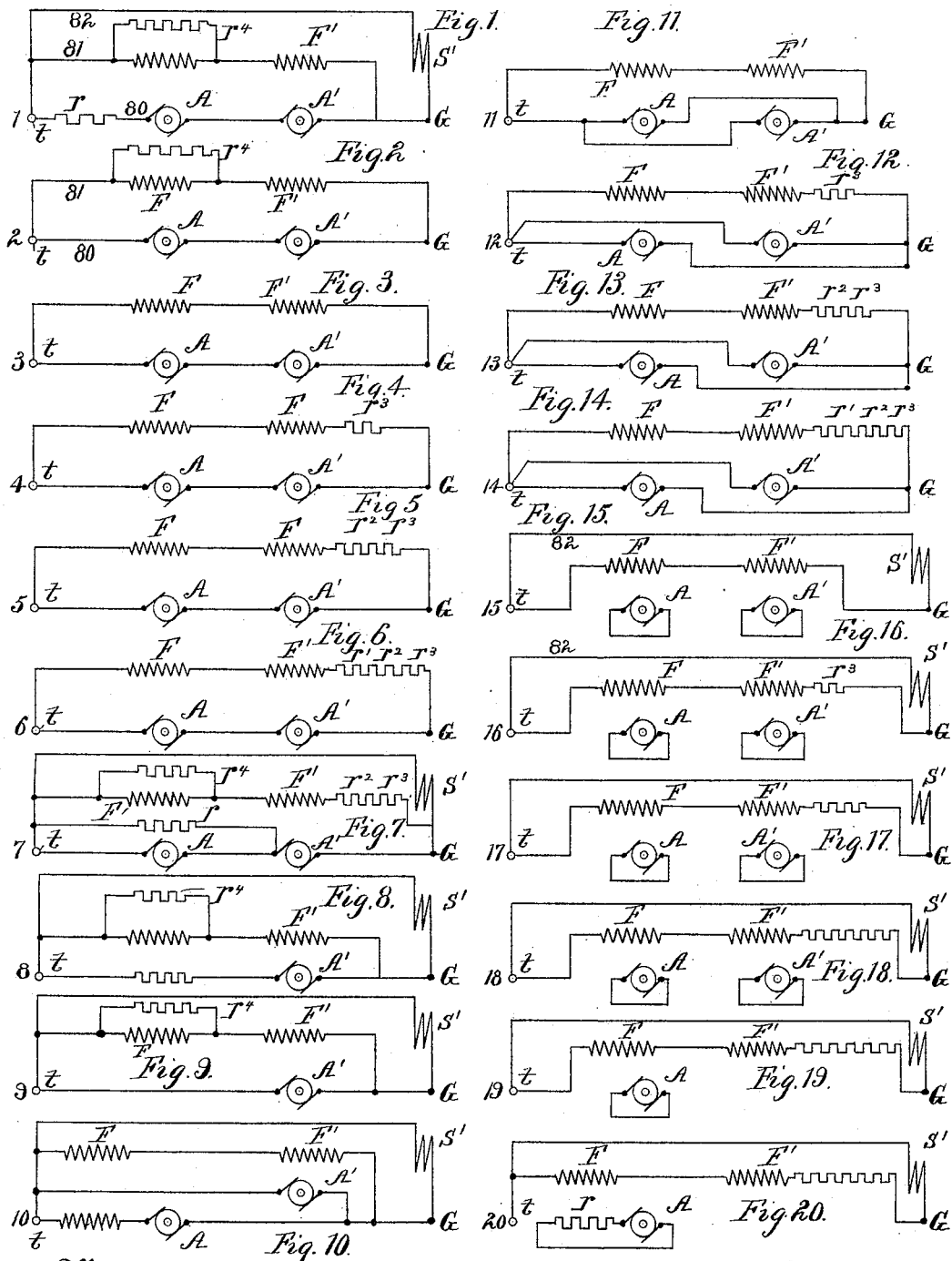

No. 606,990. Patented July 5, 1898.
J. C. HENRY.
ELECTRIC RAILWAY.
(Application filed Apr. 18, 1898.)
(No Model.) 3 Sheets—Sheet 2.

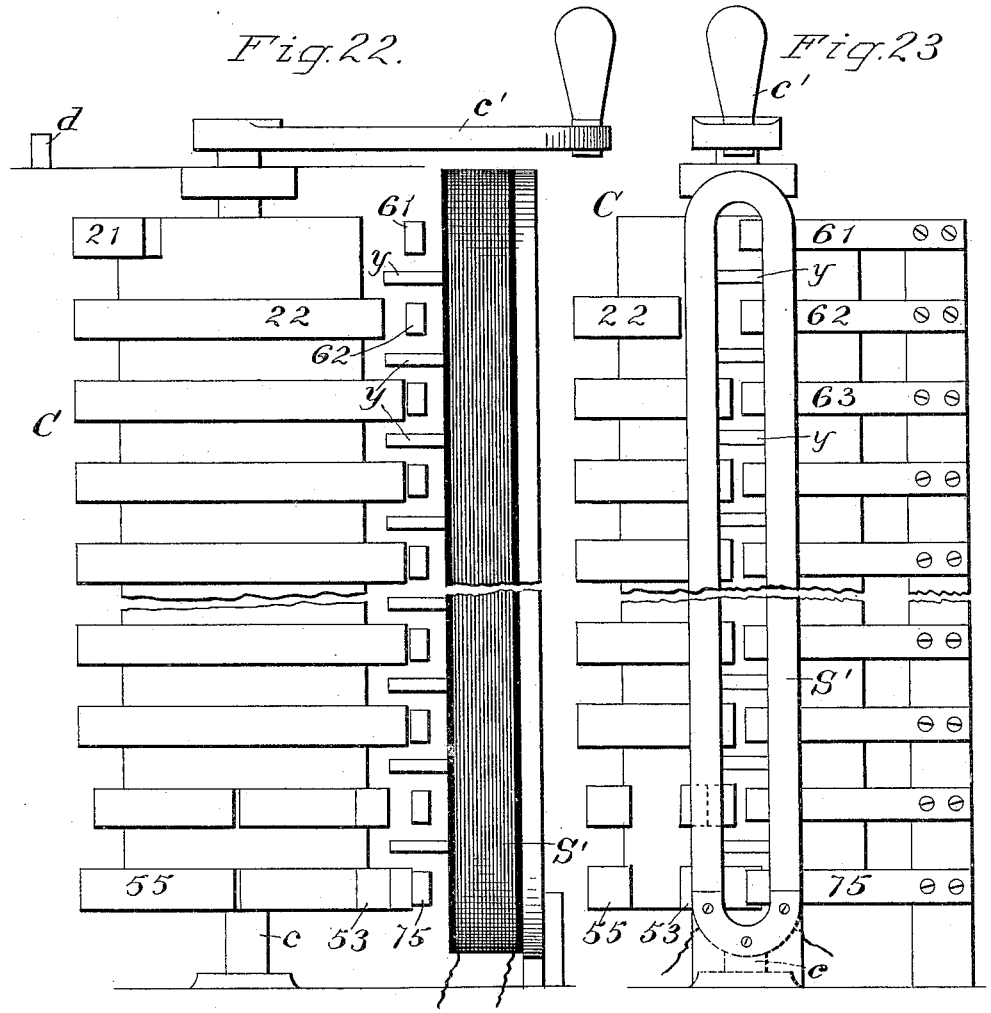

UNITED STATES PATENT OFFICE.

JOHN C. HENRY, OF DENVER, COLORADO.

ELECTRIC RAILWAY.

SPECIFICATION forming part of Letters Patent No. 606,990, dated July 5, 1898.

Application filed April 18, 1898. Serial No. 677,957. (No model.)

*To all whom it may concern:*

Be it known that I, JOHN C. HENRY, a citizen of the United States, residing at Denver, county of Arapahoe, State of Colorado, have invented certain new and useful Improvements in Electric Railways, of which the following is a specification.

This invention relates to improvements in electric railways, and particularly to improvements in the controlling devices and connections of two-motor car equipments. Such improvements are directed especially to the avoidance of violent changes in current strength or mechanical strain and to the prevention of violent and destructive arcing in the operation of making the necessary changes in the electrical connections. For this purpose I provide means whereby one of the armatures may be substantially relieved of current at or just before the time at which its circuit is to be broken in order to throw it from series to parallel connection; and I also provide the controller which effects such changes in the connections with improved arc-rupturing devices for quickly rupturing any arcs that may be formed therein.

Referring to the accompanying drawings, which form a part of this specification, Figures 1 to 20 are diagrams representing different conditions of the circuit connections established by the controlling devices, as hereinafter described. Fig. 21 is a diagrammatic development of the controller, showing its connections with the motors and other parts of the car equipment. Fig. 22 is an elevation of the controller, and Fig. 23 is a view at right angles to Fig. 22.

In Figs. 1 to 21, A and A' represent the two armatures of a two-motor car equipment, and F F' the two field-magnets thereof. The controller C is provided with movable contacts 21 to 56 and fixed contacts 61 to 75, whereby the connections of the armatures and field-magnets of the motors with one another and with line connection $t$, ground connection G, and resistances $r$ $r'$ $r^2$ $r^3$ $r^4$ are varied, as hereinafter described. The dotted lines 1 to 20 indicate lines of contact of the fixed and movable controller-contacts corresponding to the similarly-numbered Figs. 1 to 20 and to the numbers marked at the left of said figures.

The system of control to which my invention is preferably applied contemplates the regulation of the motors in such manner that they may act either to propel the car by energy derived from the line or may act to retard the car by delivering energy either to the line or to closed brake-circuits. The controller, as usual, comprises a series of insulated contacts mounted on a rotatable shaft, (shown at $c$ in Figs. 22 and 23,) having a handle $c'$, whereby it may be operated. The line marked 0 in Fig. 21 corresponds to the open position of the controller, and the latter being cylindrical it will be understood that the position 0 is contiguous to position 1 on the one hand and to position 20 on the other, the controller being turned from position 1 through the successive positions 1 2 3, &c., to 14 in accelerating the car, and if the car is to be retarded the controller being then turned back through position 13 12, &c., to 0 and continuing on through positions 20 19, &c., to position 15, which is the final braking position. The controller should not therefore be turned from position 14 to position 15, or vice versa, directly, but only by passing through all the intermediate positions, and a suitable stop may be provided limiting the rotation of the controller at the point marked $x$, such a stop being indicated at $d$ in Fig. 22. Starting then at the open-circuit position shown at 0 in Fig. 21, it will be seen that in this position all the armature and field-magnet circuits are broken. Moving the controller to position 1, the armature-circuits are closed in series between line and ground and the field-magnets are also in series. The circuits pass from line connection $t$ through main switch $m$, fuses $f$, through three branches—namely, the armature-circuit 80, the field-magnet circuit 81, and a special circuit 82, leading to the arc-rupturing device hereinafter described. The armature-circuit in this position may be traced as follows: from line connection $t$, wire 80, contact 62, resistance $r$, contacts 63 25, connection 90, contacts 29 64, armature A, contacts 65 32, connection 114, contacts 35 66, armature A' to contact 67, which is connected to ground at G. The field-magnet circuit passes from the line connection $t$ through wire 81 and reversing-switch S to fixed contact 73, thence through cylinder-contact 51, connection 115, contacts 50 72, through field-magnets F F' in series to contact 71, reversing-switch S to contacts 70 45, and thence through connection 108 to the grounding contact 37. A shunt connection also leads around magnet F as follows: from the junction-point $j$ between the two magnets to resistance $r^4$, thence to contacts 74 52 and connection 110 to contact 48. The shunt-circuit through resistance $r^4$ permits an excess of current to pass through field-magnet F', and thus produces an exceedingly strong field in that motor. At the same time the resistance $r$ is included in the armature-circuit, and under these conditions the minimum accelerating effect will be produced, thus giving an easy start. Position 2 short-circuits resistance $r$ by contacts 22 25, connected by connection 116, and the next change to position 3 breaks the shunt around magnet F. The steps to positions 4, 5, and 6 then successively insert resistances $r^3$, $r^2$, and $r'$ in the field-magnet circuit by the operation of contacts 45 42 39, connected to grounding contact 37 by connections 108 100 101. The field-magnets are now weakened by the resistance in circuit therewith, so as to produce the maximum acceleration that can be obtained with a series connection of the armatures. To enable the armatures to then be changed to parallel connection without undue sparking or violent changes of current or electromotive force, I proceed as follows: A shunt-circuit is closed around one of the armatures, this shunt-circuit being of sufficient conductivity to substantially divert the line-current from the armature, but not to cause short-circuiting of the armature. The resistance which it is necessary to insert in the shunt-circuit in order to effect this object depends on the conditions of speed, load, line, and counter electromotive force. Assuming a certain average or probable value for these factors, it will appear that the resistance of the shunt-circuit should be such that an electromotive force equal to the counter electromotive force of the armature will produce a current through this resistance sufficient to supply all of the current needed by the other armature from the propulsion of the car under the given conditions of load. Under these circumstances there will be little or no current through the shunted armature, for the reason that its own counter electromotive force is equal to the electromotive force at its terminals, due to the flow of current through the shunt, so that there will be neither a propelling-current through the armature from the line, such as would be caused by an excess of the impressed electromotive force over the counter electromotive force, nor a short-circuiting retarding-current, such as would be due to an excess of the counter electromotive force over the impressed electromotive force. This shunt-circuit is brought into operation in position 7 (see Figs. 7 and 21) by contacts 26 32, connected by connection 92, engaging with fixed contacts 63 65, the shunt-circuit leading from contact 62, resistance $r$, contacts 63 26, connection 92, and contacts 32 65 to armature-contact. The resistance $r$ is of sufficient magnitude to produce practically complete cessation of current in armature A under the conditions which will usually exist when this change is to be effected. The circuit is still complete through armature A', through contacts 62 22, and connections 116 90 or connection 116$^a$. At the same time a shunt may be closed around field-magnet F by contacts 49 53, connected by connection 101, engaging with fixed contacts 71 74, whereby a shunt around said magnet F, including the resistance $r^4$, is closed, as before, the resistance $r^4$ being sufficient to prevent deënergization of the field-magnet F, but allowing an extra amount of current to pass to field-magnet F', thus superenergizing same and enabling the corresponding motor to bear the extra load thrown thereon at this time. The next step to position 8 breaks the connection to armature A through contacts 62 22, and armature A' is thus left in a circuit between line and ground, including resistance $r$, as indicated in Fig. 8. In position 9 this resistance is removed from the circuit, connection being made directly to armature A' by contacts 62 23, connection 93, and contacts 35 66. During these positions 8 and 9 the resistances $r'$ $r^2$ $r^3$ are short-circuited from the field-magnet circuit by contacts 46 37 and connection 109.

Position 10 closes a connection from line through resistance $r$, contacts 63 27, connection 94, and contacts 29 64 to armature A, thus putting armature A in multiple with armature A', but with sufficient resistance in its circuit to bring it gradually into action. The shunt around field-magnet F is now broken, as indicated in Figs. 10 and 21. Position 11 makes a direct connection from line to armature A through contacts 61 21, connection 95, and contacts 29 64, thus putting the armatures in full multiple connection. Positions 12, 13, and 14 then successively insert resistances $r^3$ $r^2$ $r'$ in the field-magnet circuit by the operation of contacts 43 40, connected to grounding contact 37 by connections 102 103. Position 14 is thus the position for maximum speed, and, as above stated, it is not intended that the controller shall be turned farther in this direction. When less acceleration or actual retardation is desired, the controller is turned back through the various positions 13 12, &c., till position 0 is reached, and then if further retardation is desired it is turned onto the braking positions 20 to 15. Position 20 puts armature A on a closed circuit through contacts 64 31, connection 97, contacts 28 63, resistance $r$, contacts 62 24, connection 96, and contacts 34 65, the field-magnet circuit being still maintained, as before, and including the maximum resistance. This connection gives a weak braking action, which is then increased in the succeeding positions by first putting armature A on shunt-circuit through contacts 30 34 and connection 118 and then short-circuiting armature A' by contacts 36 38 and connection 99 and short-circuiting the resistances from the field-magnet circuit by the operation of contacts 38 41 44 47 and connections 107 106 105. I also provide contacts 53 55 56 on the controller-cylinder, which engage with fixed contact 75 to close a connection from line through the shunt-circuit 82, including a solenoid S' for rupturing the arcs formed at the contact of the controllers these said contacts 53 55 56 being arranged as indicated, so as to bring this blow-out solenoid into operation at the times when the circuit of one or both of the armatures is interrupted. An additional function of this shunt-circuit 82 is to furnish a path for the high-tension induced discharges from the field-magnets when the line connection is interrupted, and such shunt-circuit is therefore preferably also maintained during the braking positions 20 to 15.

The arrangement of the arc-rupturing solenoid S' is indicated in Figs. 22 and 23, it being preferably a vertical spool of wire, which is elongated sufficiently to be in proximity to the several sets of contacts of the controller. In said figures, $y$ represents insulating and refractory arc-deflecting plates. By "solenoid" it will be understood that I mean a spool or coil of wire having suitable connections to the energizing-circuit, but being without any iron core or frame.

The method or means I have described for "killing" or nullifying the current in the armature before it is shifted from series to parallel connection has the advantage that it is not necessary to wait until the field-magnet is more or less completely deënergized before making such change of connection from series to parallel, and, in fact, it is not necessary to deënergize the field-magnet at all. This principle of operation is applicable to two-motor car equipments of any type independently of the relative connection of the field-magnets and armatures, and therefore although I have here shown it in connection with a system wherein the field-magnets and armatures are in separate circuits I do not desire it to be considered as limited thereto.

Having thus described my invention, the following is what I claim as new therein and desire to secure by Letters Patent:

1. The method of changing the armatures of a two-motor car equipment from series to parallel connection which consists in closing a shunt around one of the armatures of such resistance as to substantially divert the line-current from the armature without the production of a short-circuiting current through the armature.

2. The method of changing the armatures of a two-motor car equipment from series to parallel connection which consists in closing a shunt around one of the armatures, of such resistance that the electromotive force from the line which is sufficient to overcome the counter electromotive force of such armature, will produce through such resistance the current required to operate the other armature, then breaking the circuit of the shunted armature and closing a connection thereto in parallel with the other armature.

3. The combination with the armatures and field-magnets of a two-motor car equipment, of controlling devices and a shunt-circuit closed around the armature of one of the motors by the operation of the controlling devices, said shunt-circuit including a resistance such as to permit the passage therethrough from the line, under an electromotive force substantially equal to the counter electromotive force of such armature, of the current required to operate the other motor, and the said controlling devices operating after the closure of such shunt, to break the series connection of the shunted armature, and then close a parallel connection to same.

4. The method of changing the electromotive devices of a two-motor car equipment from series to parallel connection which consists in closing a shunt around one of the electromotive devices, of such resistance that the electromotive force from the line which is sufficient to overcome the counter electromotive force of such electromotive device, will produce through such resistance the current required to operate the other electromotive device, then breaking the circuit of the shunted electromotive device and closing a connection thereto in parallel with the other electromotive device.

5. The combination with the electromotive devices of a two-motor car equipment, of controlling devices and a shunt-circuit closed thereby around one of the electromotive devices including a resistance such as to divert the line-current from the shunted electromotive device and to prevent the passage of a short-circuiting current through same from the shunted electromotive device, and the said controlling devices operating after the closure of such shunt-circuit, to break the series connection of the shunted electromotive device and close a parallel connection for same.

6. The combination with the electromotive devices of a two-motor car equipment, of controlling devices and a shunt-circuit closed thereby around one of the electromotive devices including a resistance such as to divert the line-current from the shunted electromotive device and to prevent the passage of a short-circuiting current through same from the shunted electromotive device, and the said controlling devices operating after the closure of such shunt-circuit, to break the series connection of the shunted electromotive device and close a parallel connection for same, including a resistance, and then to short-circuit such resistance.

JOHN C. HENRY.

Witnesses:
MARY HAMPTON LLOYD,
JOHN S. GIBONS.